United States Patent [19]

Kohler

[11] Patent Number: 4,549,055

[45] Date of Patent: Oct. 22, 1985

[54] VENTILATING MEANS FOR COOKING APPARATUS

[75] Inventor: Charles F. Kohler, Oxford Township, Delaware County, Ohio

[73] Assignee: Whirlpool Corporation, Benton Harbor, Mich.

[21] Appl. No.: 560,851

[22] Filed: Dec. 12, 1983

[51] Int. Cl.[4] .......................... H05B 6/60; A21B 1/00; F24C 15/32

[52] U.S. Cl. .............................. 219/10.55 R; 219/380; 126/21 A; 126/21 R

[58] Field of Search .................. 219/10.55 R, 10.55 B, 219/10.55 C, 10.55 D, 10.55 F, 405, 380, 367, 368, 369, 370, 374, 400; 126/21 A, 21 R, 299 D; 98/115 A

[56] References Cited

U.S. PATENT DOCUMENTS

| | | | |
|---|---|---|---|
| 2,860,026 | 11/1958 | Long | 219/10.55 B |
| 3,131,688 | 5/1964 | Lipstein | 126/299 |
| 3,612,825 | 10/1971 | Chase et al. | 219/405 |
| 3,707,145 | 12/1972 | Anetsberger et al. | 126/21 A |
| 3,818,171 | 6/1974 | Miller et al. | 219/10.55 R |
| 3,882,843 | 5/1975 | Barnett | 126/273 A |
| 4,143,646 | 3/1979 | Sampsel | 219/10.55 R |
| 4,180,049 | 12/1979 | Carr et al. | 126/21 A |
| 4,184,945 | 1/1980 | Morgan et al. | 219/10.55 D |
| 4,286,456 | 9/1981 | Sisti et al. | 219/400 |

FOREIGN PATENT DOCUMENTS

| | | | |
|---|---|---|---|
| 54-10448 | 1/1979 | Japan | 219/10.55 R |

*Primary Examiner*—Roy N. Envall, Jr.
*Assistant Examiner*—M. M. Lateef
*Attorney, Agent, or Firm*—Wood, Dalton, Phillips, Mason & Rowe

[57] ABSTRACT

A cooking apparatus wherein a control for controlling the operation of one or more portions thereof is located in a position where it could be affected by hot, contaminated air rising from heating portions of the apparatus. The control is mounted in a cabinet space which is pressurized so as to prevent hot, contaminated air from entering the space, thereby effectively avoiding deleterious effect. Pressurizing air is drawn from a location free of the hot, contaminated air from the cooking units. The drawn pressurizing air is also delivered to an oven cavity of the apparatus connected in series air flow relationship with the space in which the control is located.

11 Claims, 2 Drawing Figures

VENTILATING MEANS FOR COOKING APPARATUS

BACKGROUND OF THE INVENTION

1. Field of the Invention

This invention relates to cooking apparatus and in particular to ventilation means for use with cooking apparatus, such as a microwave oven.

2. Description of the Background Art

In one conventional form of microwave oven, the oven is installed in overlying relationship to an oven range unit so as to be substantially at eye level. A problem arises in such appliances in that hot, contaminated air from the underlying oven and surface units may damage the microwave oven electrical components.

A number of different attempts have been made to solve this vexatious problem. Illustratively, in U.S. Pat. No. 3,131,688, of Norman J. Lipstein, a blower is provided in series with filter means for delivering filtered air to the overlying oven means.

In U.S. Pat. No. 3,162,825, of William Byer Chase et al., air flow means are provided for drawing air from rearwardly of the oven and delivering it through the windowed door of the oven to cool the door during operation of the oven.

Richard J. Anetsberger et al., in U.S. Pat. No. 3,707,145, similarly show an oven having means for drawing air in from the rear thereof and conducting it through a bottom wall space and through sidewall spaces to direct the cooling air upwardly over the front door means and the control means.

In U.S. Pat. No. 3,818,171, Matthew S. Miller et al. disclose an eye-level microwave oven disposed above a subjacent cooking surface, wherein a ventilation duct extends from either the bottom or the back of the microwave oven to a bottom chamber of the apparatus. The air in the control space of the microwave oven is at below atmospheric pressure as it communicates with the inlet to the blower delivering the air to the oven cavity.

Eugene J. Barnett, in U.S. Pat. No. 3,882,843, discloses a self-cleaning wall oven having a blower at the rear of the oven for drawing air in through a perimetric gap between the front frame of the assembly and the wall cabinet along at least the opposite sides and the top of the assembly. Air is also drawn in through an intermediate passage between an upper control chamber and a lower oven capacity structure. The air is delivered by the fan at the rear of the oven assembly back into the room through opposite side passages and through the control chamber having an outlet along its front top edge.

In U.S. Pat. No. 4,180,049 of Keith E. Carr et al., which patent is owned by the assignee hereof, a fan is disposed in a space rearwardly of the upper oven for drawing air not only around the upper oven but also through it for delivery forwardly through a passage between the upper oven and a lower oven.

In U.S. Pat. No. 4,184,945, Thomas J. Morgan et al. disclose a microwave wall oven air flow system wherein fans are provided for drawing air inwardly from a front top portion of the oven adjacent a portion of the control panel. The fans operate in parallel in delivering the air to a rear chamber for subsequent delivery therefrom through a lower outlet opening.

SUMMARY OF THE INVENTION

The present invention comprehends an improved cooking apparatus having cavities defining an oven cavity and a control space. Electrical control means are provided in the control space for energizing the cooking apparatus and novel ventilating means are provided for pressurizing the control space for preventing undesirable air from entering the control space.

More specifically, the invention comprehends the provision of such improved ventilating means including first supply means for providing pressurized air to the oven cavity, second supply means for providing pressurized air to the control space, and first discharge means for discharging the pressurized air from the oven cavity while maintaining an above-ambient pressure in the cabinet means.

In the illustrated embodiment, the second supply means further comprises means for providing pressurized air to the first supply means.

In the illustrated embodiment, a second discharge means is provided for discharging the pressurized air from the control space.

The first supply means comprises means for drawing air from the control space.

The second supply means, in the illustrated embodiment, provides pressurized air to the control space as an incident of the temperature in the cabinet exteriorly of the oven cavity rising above a preselected temperature during energization of the cooking apparatus.

In the illustrated embodiment, the control means comprises means for providing microwave energy to the oven cavity.

In the illustrated embodiment, the cooking apparatus includes heating means spaced subjacent the cabinet means and the second supply means defines an inlet disposed to provide air to the control space other than from above the heating means.

In the illustrated embodiment, the control means further includes means for controlling energization of the heating means.

The invention comprehends the provision in a cooking apparatus having a cabinet defining an interior space and means defining an oven cavity in the space of a plurality of discrete air moving means disposed in series relationship for providing a first pressurized condition in the space exteriorly of the oven cavity and a second pressurized condition in the oven cavity, and means for discharging the pressurized air from the cabinet.

In the illustrated embodiment, the air discharging means comprises means for discharging pressurized air in the cabinet space directly to exteriorly of the cabinet.

In the illustrated embodiment, the second pressurized condition comprises a higher pressure than that of the first pressurized condition.

The cooking unit illustratively is spaced subjacent the cabinet and the air moving means comprises means for drawing air from a location other than the space between the cabinet and the cooking unit.

In the illustrated embodiment, the subjacent cooking unit includes at least one surface burner.

The improved cooking apparatus ventilating means of the present invention is extremely simple and economical of construction while yet providing the highly desirable features discussed above.

BRIEF DESCRIPTION OF THE DRAWING

Other features and advantages of the inventon will be apparent from the following description taken in connection with the accompanying drawing wherein.

DESCRIPTION OF THE PREFERRED EMBODIMENT

Figure 1:
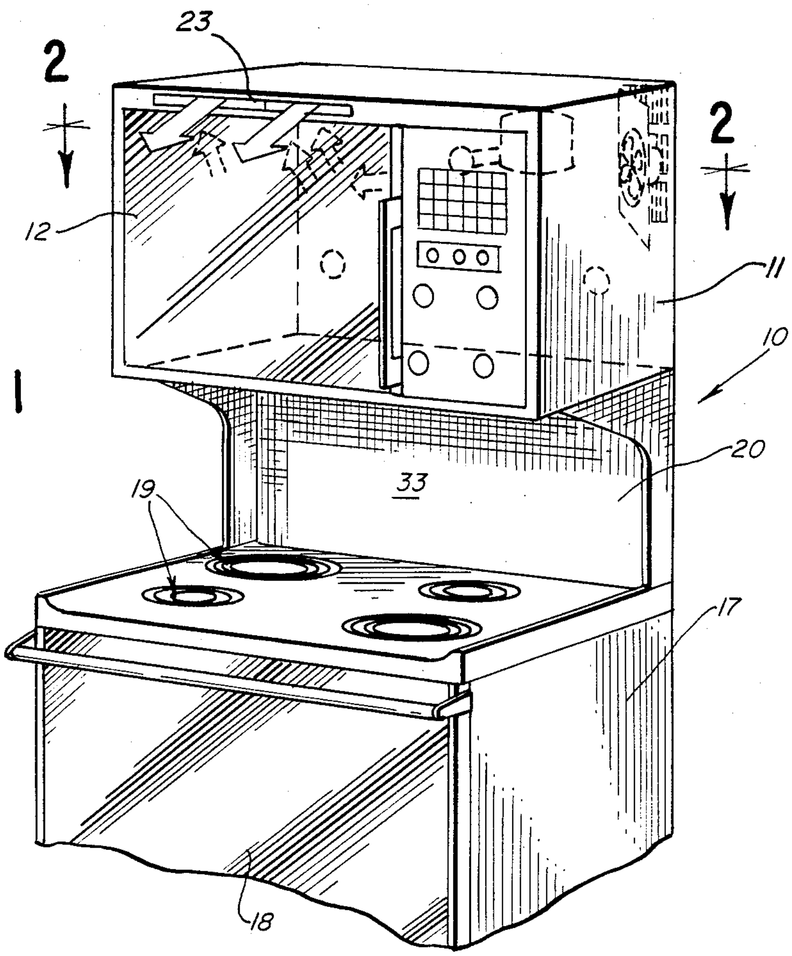
FIG. 1 is a fragmentary perspective view of a cooking apparatus having ventilating means embodying the invention.
Figure 2:
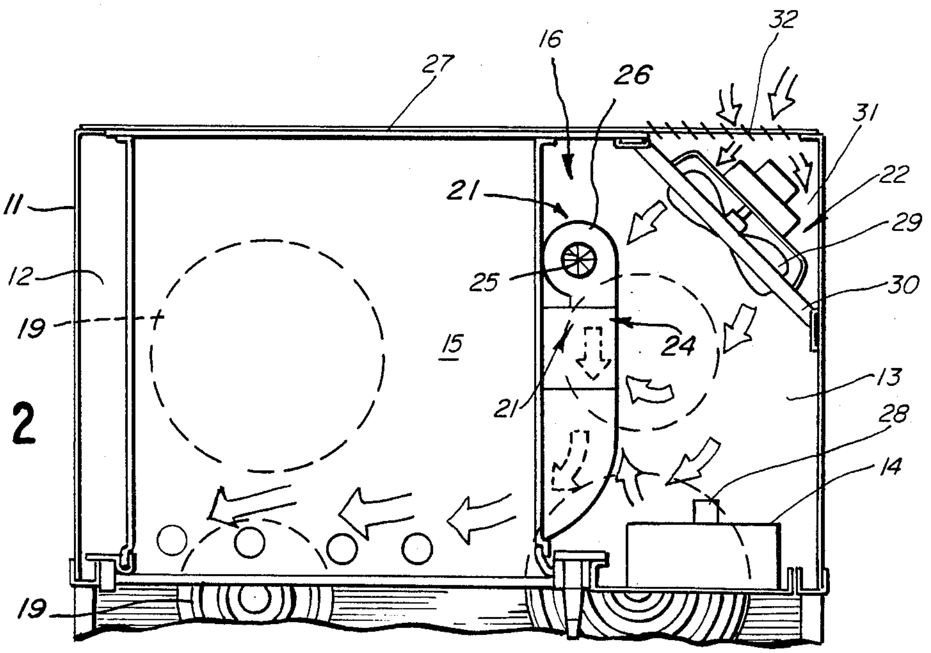
FIG. 2 is an enlarged fragmentary horizontal section taken substantially along the line 2—2 of FIG. 1.

In the exemplary embodiment of the invention as disclosed in FIGS. 1 and 2, a cooking apparatus generally designated 10 is shown to include a cabinet 11 housing an oven 12 and defining an internal control space 13. Electrical control means 14 are disposed in the control space for energizing selectively the cooking apparatus.

In the illustrated embodiment, oven 12 comprises a microwave oven defining an internal oven cavity 15. The invention comprehends improved ventilating means generally designated 16 for providing a desirable pressure condition within cabinet 11.

More specifically, as shown in FIG. 1, cooking apparatus 10 further includes a subjacent stove portion 17 defining an oven 18 and surface burner units 19. As shown in FIG. 1, the cabinet 11 is spaced above the stove portion 17 by a rear wall support 20.

As best seen in FIG. 2, the ventilating means 16 includes a first supply means generally designated 21 for providing pressurized air to the oven cavity 15 after cooling a magnetron 24. A second air supply means generally designated 22 provides pressurized air to the control space 13. A first discharge means 23 is provided above the cavity 15 for discharging pressurized air from the oven cavity 15 while effectively maintaining an above-ambient pressure condition in the cabinet 11. As further shown in FIG. 2, no discharge means is provided for discharging pressurized air from control space 13 other than to first pressurized air supply means 21 and other than cracks between joined panels and thus air supply means 22 maintains the pressure in control space 13 above ambient.

In the illustrated embodiment, the inlet 25 to blower 26 of first air supply means opens to control space 13 and thus comprises a second discharge means in the air flow path through the cabinet 11, whereby the second air supply means 22 comprises means for providing pressurized air to the first supply means 21.

Control 14 includes a temperature sensor 28 of conventional construction and cooperates with control 14 for causing the second air supply means 22 to provide pressurized air to the control space as an incident of the temperature in the cabinet 11 exteriorly of the oven cavity 15 rising above a preselected temperature as a result of energization of the cooking apparatus 10.

As shown in FIG. 2, second air supply means 22 includes a fan 29 mounted in a baffle wall 30 defining an inlet space 31 opening to the rear of cabinet 11 through a rear inlet opening 32 therein. The invention comprehends that the inlet to the second air supply means be disposed to provide air to the control space 13 other than from the space 33 above the stove 17.

Control 14, in the illustrated embodiment, further includes the controls for the oven 18 and surface burner units 19.

Thus, the invention comprehends the provision of means for maintaining a positive, or above-ambient, pressure in control space 13 when the microwave oven 12 is energized. This keeps the hot, contaminated air rising from the subjacent oven and surface units from entering the control space and microwave oven, thereby minimizing maintenance requirements and providing long troublefree life of the controls and microwave oven apparatus.

By virtue of the indicated arrangement of the first and second air supply means 21 and 22, the fan 29 and blower 26 are effectively disposed in series relationship for providing a first pressurized condition in the control space 13 exteriorly of the oven cavity, and a second pressurized condition in the oven cavity 15. In the illustrated embodiment, the second pressurized condition in oven cavity 15 comprises a higher pressure than that of the first pressurized condition in the control space 13.

By providing the inlet opening 32 to the fan space 31 through the rear wall of the cabinet 11, air is drawn from rearwardly of the cooking apparatus 10, thereby effectively avoiding introduction of the hot, contaminated air rising from the stove portion 17 into the cabinet 11.

Thus, the control 14 for controlling both the operation of microwave oven 12 and the subjacent oven 18 and surface burning units 19 is protected from deleterious effects of contaminated heated air rising from the stove portion 17 in a novel and simple manner.

The foregoing disclosure of specific embodiments is illustrative of the broad inventive concepts comprehended by the invention.

I claim:

1. In a cooking apparatus having cabinet means defining an oven cavity and a control space, and electrical control means in said control space for energizing the cooking apparatus, improved ventilating means comprising:

first supply means for drawing air from said control space and providing the drawn air as pressurized air to said oven cavity;

second supply means for providing pressurized air to said control space; and discharge means for discharging the pressurized air from said oven cavity, said first and second supply means and discharge means being cooperatively arranged to maintain an above-ambient pressure at said control means.

2. The cooking apparatus of claim 1 further including second discharge means for discharging the pressurized air from said control space while maintaining the pressure in said control space above ambient pressure.

3. The cooking apparatus of claim 2 wherein said first and second discharge means are spaced substantially apart.

4. In a cooking apparatus having cabinet means defining an oven cavity and a control space, and electrical control means in said space for energizing the cooking apparatus, improved ventilating means comprising:

first supply means for drawing air from said control space and providing the drawn air as pressurized air to said oven cavity;

second supply means for providing clean pressurized air to said control space as an incident of the temperature in said cabinet exteriorly of said oven cavity rising above a preselected temperature as a result of energization of the cooking apparatus; and discharge means for discharging the pressurized air from said oven cavity, said first and second supply means and discharge means being cooperatively arranged to maintain an above-ambient pressure throughout said cabinet means.

5. The cooking apparatus of claim 4 wherein said control means comprises means for providing microwave energy to said oven cavity.

6. The cooking apparatus of claim 4 wherein said cooking apparatus further includes heating means spaced subjacent said cabinet means.

7. The cooking apparatus of claim 4 wherein said cooking apparatus further includes heating means spaced subjacent said cabinet means, said second supply means having an inlet disposed to provide air to said control space other than from above said heating means.

8. The cooking apparatus of claim 4 wherein said cooking apparatus further includes heating means spaced subjacent said cabinet means, said control means further including means for controlling energization of said heating means.

9. In a cooking apparatus having cabinet means defining an upper portion defining an oven cavity and a control space, heating means subjacent said upper portion of the cabinet means, and electrical control means in said control space for energizing the cooking apparatus, improved ventilating means comprising:

first supply means for drawing air from said control space and providing the drawn air as pressurized air to said oven cavity;

second supply means for providing clean pressurized air to said control space and having an inlet disposed to provide air to said control space other than from above said heating means; and discharge means for discharging the pressurized air from said oven cavity, said first and second supply means and discharge means being cooperatively arranged to maintain an above-ambient pressure at said control means.

10. The cooking apparatus of claim 9 wherein said cabinet means defines a rear wall having an upper portion and said second supply means inlet opens through said rear wall at said upper portion thereof.

11. The cooking apparatus of claim 9 wherein said cabinet means defines a rear wall having an upper portion and said second supply means inlet opens through said rear wall at said upper portion thereof, said cabinet means further defining a front wall and said discharge means opens through said front wall in a direction oppositely to the opening of said inlet through said rear wall.

* * * * *